United States Patent
Lu et al.

(10) Patent No.: US 11,999,352 B2
(45) Date of Patent: Jun. 4, 2024

(54) METHOD AND SYSTEM FOR EXTRACTING ROAD DATA AND METHOD AND SYSTEM FOR CONTROLLING SELF-DRIVING CAR

(71) Applicant: INDUSTRIAL TECHNOLOGY RESEARCH INSTITUTE, Hsinchu (TW)

(72) Inventors: Victor Lu, Hsinchu County (TW); Chun-Jung Lin, Pingtung (TW); KunLung Ku, Changhua County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 161 days.

(21) Appl. No.: 17/552,177

(22) Filed: Dec. 15, 2021

(65) Prior Publication Data
US 2023/0182743 A1  Jun. 15, 2023

(51) Int. Cl.
*B60W 40/06* (2012.01)
*B62D 6/00* (2006.01)

(52) U.S. Cl.
CPC ............ *B60W 40/06* (2013.01); *B62D 6/002* (2013.01); *B60W 2552/15* (2020.02); *B60W 2552/30* (2020.02); *B60W 2552/35* (2020.02)

(58) Field of Classification Search
None
See application file for complete search history.

(56) References Cited

U.S. PATENT DOCUMENTS

| 8,306,747 B1 | 11/2012 | Gagarin et al. |
| 9,626,763 B1 | 4/2017 | Hoye et al. |
| 9,830,509 B2 | 11/2017 | Zang et al. |
| 11,270,437 B1 * | 3/2022 | Volta ............... G06V 10/273 |

(Continued)

FOREIGN PATENT DOCUMENTS

| CN | 103266552 A | 8/2013 |
| CN | 109407115 A | 3/2019 |

(Continued)

OTHER PUBLICATIONS

Lin et al., "Filling Holes in 3D Scanned Model Base on 2D Image Inpainting", Department of Computer Science and Information Engineering, National Central University, 2017 10th International Conference on Ubi-media Computing and Workshops (Ubi-Media) (Year: 2017).*

(Continued)

*Primary Examiner* — Amelia Vorce
(74) *Attorney, Agent, or Firm* — Maschoff Brennan (57) ABSTRACT

A method for extracting road data comprises obtaining ground data from first environment detection data of a detected region. A first ground model may be obtained using the ground data. A missing region of the first ground model may be filled to obtain a second ground model. Road attributes of the detected region may be obtained according to the second ground model. Road damage recognition may be performed using second environment detection data of the detected region and the second ground model. The method may include storing the road attributes and the result of the road damage recognition as pieces of road data of the detected region.

22 Claims, 10 Drawing Sheets

(56) References Cited

U.S. PATENT DOCUMENTS

| | | | |
|---|---|---|---|
| 11,790,779 B2* | 10/2023 | Toma | G01C 21/367 |
| | | | 701/419 |
| 2009/0289938 A1* | 11/2009 | Paulsen | A61B 5/0064 |
| | | | 345/420 |
| 2013/0238305 A1 | 9/2013 | Digiacobbe et al. | |
| 2014/0121902 A1 | 5/2014 | Moran et al. | |
| 2017/0357262 A1* | 12/2017 | Dix | A01B 69/008 |
| 2018/0364717 A1 | 12/2018 | Douillard et al. | |
| 2019/0163958 A1* | 5/2019 | Li | G01S 17/931 |
| 2019/0180502 A1* | 6/2019 | England | G01S 7/417 |
| 2019/0325595 A1* | 10/2019 | Stein | G06V 20/58 |
| 2020/0026925 A1* | 1/2020 | Yu | G06V 20/188 |
| 2020/0250984 A1* | 8/2020 | Kundu | G08G 1/165 |
| 2021/0001877 A1* | 1/2021 | Han | B60W 60/001 |
| 2021/0097311 A1 | 4/2021 | McBeth et al. | |
| 2021/0124564 A1 | 4/2021 | Giltner et al. | |
| 2021/0155248 A1 | 5/2021 | Cox et al. | |
| 2021/0256718 A1* | 8/2021 | Gangundi | G06V 10/82 |
| 2021/0370968 A1* | 12/2021 | Xiao | G01S 17/931 |
| 2022/0024485 A1* | 1/2022 | Theverapperuma | |
| | | | G06V 20/588 |
| 2022/0044034 A1* | 2/2022 | RoyChowdhury | B60W 30/02 |
| 2022/0067396 A1* | 3/2022 | Okubo | G06V 20/64 |
| 2022/0111868 A1* | 4/2022 | Costea | G06T 17/10 |
| 2022/0135021 A1* | 5/2022 | Furuta | B60G 17/0165 |
| | | | 701/41 |
| 2022/0391692 A1* | 12/2022 | Laszlo | G06N 3/08 |
| 2023/0135088 A1* | 5/2023 | Wang | G06N 3/063 |
| | | | 701/23 |
| 2023/0186647 A1* | 6/2023 | Mahata | G06V 10/26 |
| | | | 382/103 |

FOREIGN PATENT DOCUMENTS

| | | | | |
|---|---|---|---|---|
| CN | 110378196 A | | 10/2019 | |
| CN | 111142116 A | | 5/2020 | |
| CN | 111985322 A | * | 11/2020 | G06K 9/00 |
| CN | 112513876 A | | 3/2021 | |
| JP | H11-250252 A | | 9/1999 | |
| JP | 2008242497 A | * | 10/2008 | G09B 29/00 |
| JP | 4206449 B2 | * | 1/2009 | G09B 29/00 |
| JP | 2013-140515 A | | 7/2013 | |
| JP | 2018-106676 A | | 7/2018 | |
| JP | 2021-009629 A | | 1/2021 | |

OTHER PUBLICATIONS

Ayhan et al., Performance comparison of different inpainting algorithms for accurate DTM generation, Applied Research LLC, Proc. of SPIE vol. 11398, 2020.

Barnes et al., PatchMatch: A Randomized Correspondence Algorithm for Structural Image Editing. ACM Trans. Graph. 28, 3, Article 24 (Aug. 2009), 11 pages.

Bertalmio et al., Image Inpainting, Electrical and Computer Engineering, University of Minnesota, Jan. 2000, pp. 417-424.

Douillard et al., On the Segmentation of 3D LIDAR Point Clouds, 2011 IEEE International Conference on Robotics and Automation, 2011, pp. 2798-2805.

Mongus et al., Ground and building extraction from LiDAR data based on differential morphological profiles and locally fitted surfaces, ISPRS Journal of Photogrammetry and Remote Sensing 93 (2014) 145-156.

Schwarz et al., Digital Map Enhancements of Electronic Stability Control, SAE Technical Paper 2010-01-0089, Apr. 2010, 17 pages.

JP Office Action dated Sep. 5, 2023 as received in Application No. 2021-203421.

TW Office Action dated Aug. 19, 2022 as received in Application No. 110146963.

Japanese Office Action issued in corresponding application No. 2021-203421, dated Apr. 9, 2024.

* cited by examiner

METHOD AND SYSTEM FOR EXTRACTING ROAD DATA AND METHOD AND SYSTEM FOR CONTROLLING SELF-DRIVING CAR

TECHNICAL FIELD

The present disclosure relates to a method for extracting road data, and particularly relates to a method for extracting road data involving building a ground model.

RELATED ART

As artificial intelligence and technology related thereto progresses, a self-driving car is regarded as the future of traffic transportation. Global car industry is devoted to developing a field of automated driving. The self-driving car is able to program a proper driving path according to a current state of the self-driving car and a road situation. Hence, obtaining delicate road data is one of important issues of the field of automated driving.

In addition to the field of automated driving, the fields of plan and protection of urban renewal, car navigation, location-based service, etc. increase demand for analyzing and obtaining the road data as an urban area rapidly develops and technology of computer software is elevated.

SUMMARY

In light of the above description, the present disclosure sets forth a method and system for extracting road data and method and system for controlling self-driving car.

According to an embodiment of the present disclosure, a method for extracting road data comprises performing following steps by a processing device: obtaining ground data from first environment detection data of a detection region; obtaining a first ground model using the ground data; filling in a missing region of the first ground model to obtain a second ground model; obtaining a plurality of road attributes of the detection region according to the second ground model; performing road damage identification using second environment detection data of the detection region and the second ground model; storing the plurality of road attributes and a result of the road damage identification as a plurality of pieces of road data of the detection region.

According to an embodiment of the present disclosure, a method for controlling self-driving car comprises performing following steps by a processing device: estimating an estimated position after operation time and car chassis control delay time according to a current position and a current velocity of a car; obtaining target road data corresponding to the prediction position from a map database; and generating a steering command according to the target road data to control the car; wherein the map database comprises a plurality of pieces of pre-stored road data of a detection region, the estimated position is in the detection region, the target road data is included in the plurality of pieces of pre-stored road data and the plurality of pieces of pre-stored road data are obtained by a road data extracting procedure, and the road data extracting procedure comprises: obtaining ground data from first environment detection data of the detection region; obtaining a first ground model using the ground data; filling in a missing region of the first ground model to obtain a second ground model; obtaining a plurality of road attributes of the detection region according to the second ground model; performing road damage identification using second environment detection data of the detection region and the second ground model; and storing the plurality of road attributes and a result of the road damage identification as a plurality of pieces of pre-stored road data of the detection region.

According to an embodiment of the present disclosure, a system for extracting road data comprises a data input device, a storage device, and a processing device, and the processing device is connected to the data input device and the storage device. The data input device is configured to receive first environment detection data and second environment detection data. The processing device is configured to perform following steps: obtaining ground data from the first environment detection data; obtaining a first ground model using the ground data; filling in a missing region of the first ground model to obtain a second ground model; obtaining a plurality of road attributes of the detection region according to the second ground model; performing road damage identification using the second environment detection data and the second ground model; storing the plurality of road attributes and a result of the road damage identification as a plurality of pieces of road data of the detection region.

According to an embodiment of the present disclosure, a system for controlling self-driving car comprising a positioning module, a car dynamic state sensing module, a steering angle control module and a processing module, and the processing module is connected to the positioning module, the car dynamic state sensing module, the steering angle control module. The positioning module is configured to obtain a current position of a car. The car dynamic state sensing module is configured to obtain a current velocity of the car. The steering angle control module is configured to control the car according to a steering command. The processing module is configured to perform following steps: estimating an estimated position after operation time and car chassis control delay time according to the current position and the current velocity of the car; obtaining target road data corresponding to the position from a map database; generating a steering command according to the target road data to control the car. The map database comprises a plurality of pieces of pre-stored road data of a detection region, the estimated position is in the detection region, and the target road data is included in the plurality of pieces of pre-stored road data and the plurality of pieces of pre-stored road data are obtained by a road data extracting procedure, and the road data extracting procedure comprises: obtaining ground data from first environment detection data of a detection region; obtaining a first ground model using the ground data; filling in a missing region of the first ground model to obtain a second ground model; obtaining a plurality of road attributes of the detection region according to the second ground model; performing road damage identification using second environment detection data of the detection region and the second ground model; storing the plurality of road attributes and a result of the road damage identification as a plurality of pieces of pre-stored road data of the detection region.

The above context of the present disclosure and the detailed description given herein below are used to demonstrate and explain the concept and the spirit of the present disclosure and provide the further explanation of the scope of the present disclosure.

DETAILED DESCRIPTION

In the following detailed description, for purposes of explanation, numerous specific details are set forth in order to provide a thorough understanding of the disclosed embodiments. According to the description, claims and the drawings disclosed in the specification, one skilled in the art may easily understand the concepts and features of the present invention. The following embodiments further illustrate various aspects of the present invention, but are not meant to limit the scope of the present invention.

Figure 1:
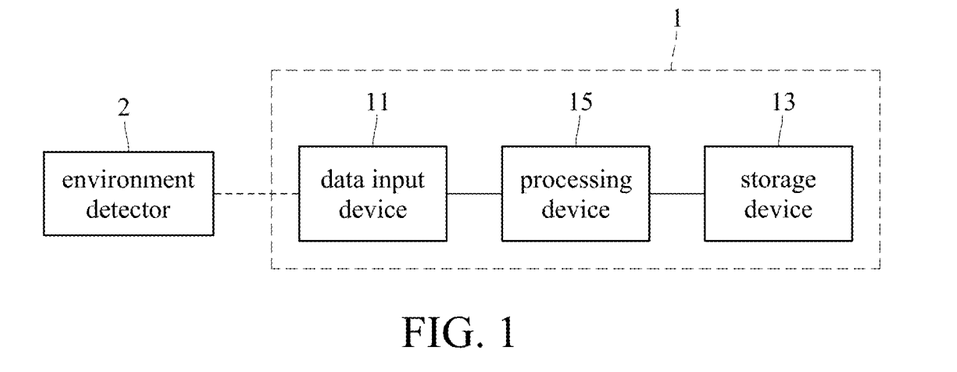
FIG. 1 is a functional block diagram of an operation environment of a system for extracting road data according to one embodiment of the present disclosure.

Please refer to FIG. 1, which is a functional block diagram of an operation environment of a system for extracting road data according to one embodiment of the present disclosure. The system for extracting road data 1 may acquire environment detection data of a certain detection region and builds a ground model of the detection region based on the detection data of the detection region accordingly. The system for extracting road data 1 may perform a complement operation on the ground model to optimize the ground model and then obtains a plurality of road attributes (for example, a slanted angle, a slope, a curvature, etc.) and a road situation (for example, positions of road damage such as holes, ruts, etc.). As illustrated in FIG. 1, the system for extracting road data 1 comprises a data input device 11, a storage device 13, and a processing device 15, wherein the processing device 15 is connected to the data input device 11 and the storage device 13 by wire connection or wireless connection.

The data input device 11 may comprise a wireless communication module using communication technology such as Wi-Fi, 4G, 5G, etc. The data input device 11 is configured to connect to an environment detector 2 to receive environment detection data detected by the environment detector 2. FIG. 1 exemplarily illustrates one environment detector 2, but the data input device 11 may be connected to a plurality of environment detectors 2. The environment detector 2 may be a LIDAR and the environment detection data it detects may be a point cloud. The environment detector 2 may be disposed in a fixed point or be collaborated with a moving platform such as an airplane, unmanned aerial vehicle (UAV), a car, etc., wherein the car is, for example, a radar plotting car, a self-driving car, etc. The data input device 11 provides the environment detection data acquired by one or more environment detectors 2 to the processing device 15 to provide the processing device 15 to perform extraction of road data of a particular detection region. Said particular detection region depends on a detection range of said one or more environment detectors 2.

The storage device 13 may comprise but not limited to a flash memory, a hard disk drive (HDD), a solid-state disk (SSD), a dynamic random access memory (DRAM), a static random access memory (SRAM). The storage device 13 may store the road data extracted by the processing device 15 as described above. In an implementation, the storage device 13, the data input device 11 and the processing device 15 are components of the same server. In another implementation, the storage device 13 and the processing device 15 are disposed in different server, and are connected with each other by wire connection or wireless connection.

The processing device 15 may comprise but not limited to a single processor or an assembly of a plurality of processors, such as a central processing unit (CPU) or a graphics processing unit (GPU). The processing device 15 is configured to obtain the environment detection data of the detection region from the data input device 11, process the environment detection data to extract the road data of the detection region, and store the extracted road data in the storage device 13 or update the road data stored in the storage device 13. The road data may comprise road attributes and a result of the road damage identification, and performing of the method for extracting road data is described in the following.

Figure 2:
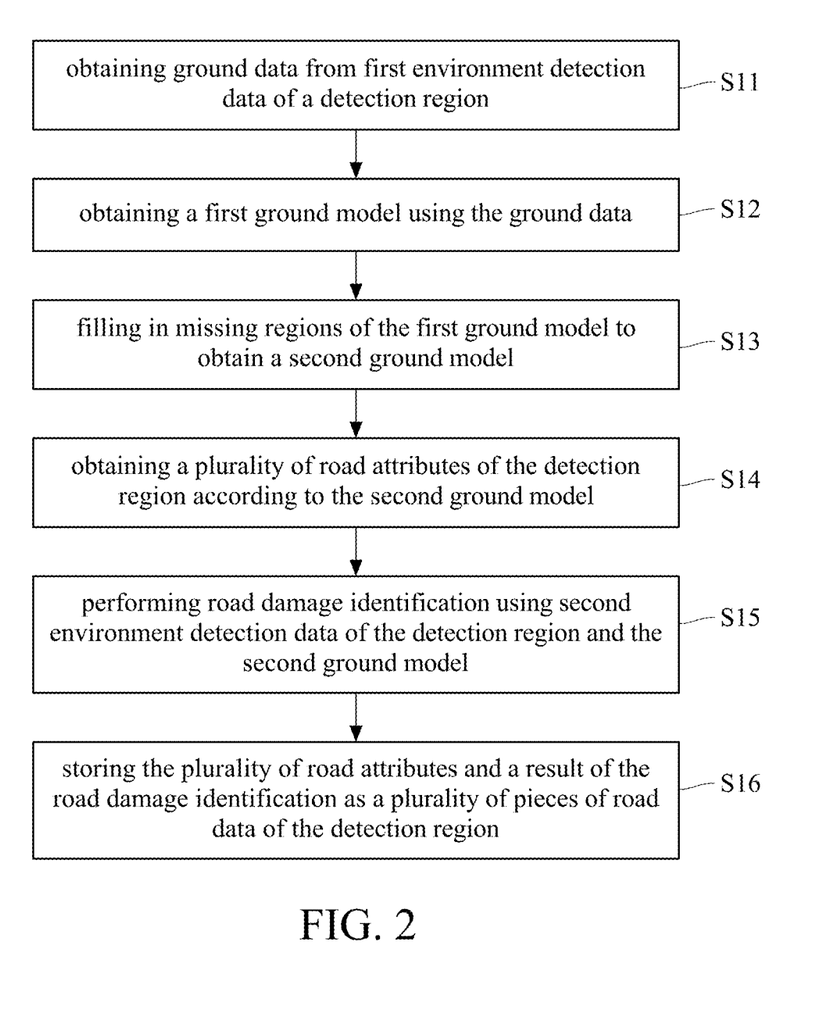
FIG. 2 is a flowchart of a method for extracting road data according to one embodiment of the present disclosure.

Please refer to FIG. 1 and FIG. 2, wherein FIG. 2 is a flowchart of a method for extracting road data according to one embodiment of the present disclosure. As illustrated in FIG. 2, the method for extracting road data may comprise: step S11: obtaining ground data from first environment detection data of a detection region; step S12: obtaining a first ground model using the ground data; step S13: filling in a missing region of the first ground model to obtain a second ground model; step S14: obtaining a plurality of road attributes of the detection region according to the second ground model; step S15: performing road damage identification using second environment detection data of the detection region and the second ground model; and step S16: storing the plurality of road attributes and a result of the road damage identification as a plurality of pieces of road data of the detection region. It needs to be explained that the present disclosure does not limit the order of step S14 and step S15. The method for extracting road as illustrated in FIG. 2 may be performed by the processing device 15 as illustrated by the system for extracting road data 1, but is not limited thereto. To be understood easily, steps of the method for extracting road data are exemplarily interpreted by the operation of the processing device 15.

Figure 3:
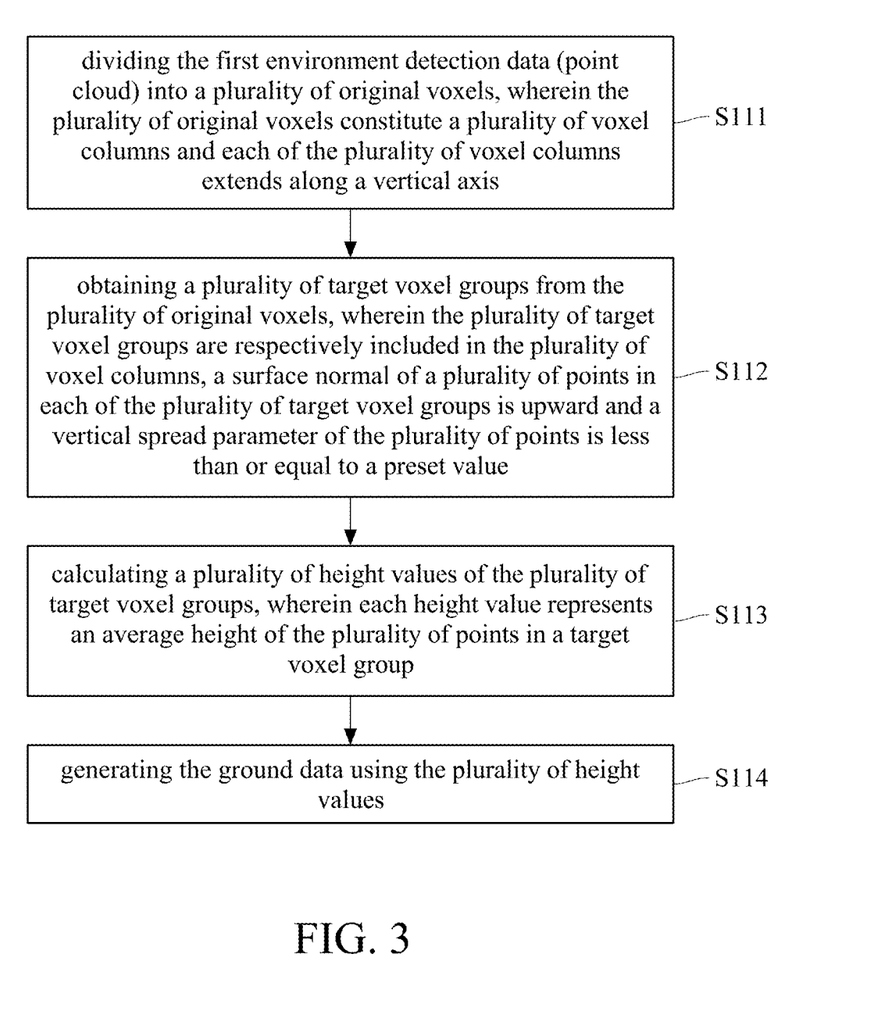
FIG. 3 is a flowchart of the step of obtaining ground data in a method for extracting road data according to one embodiment of the present disclosure.
Figure 4:
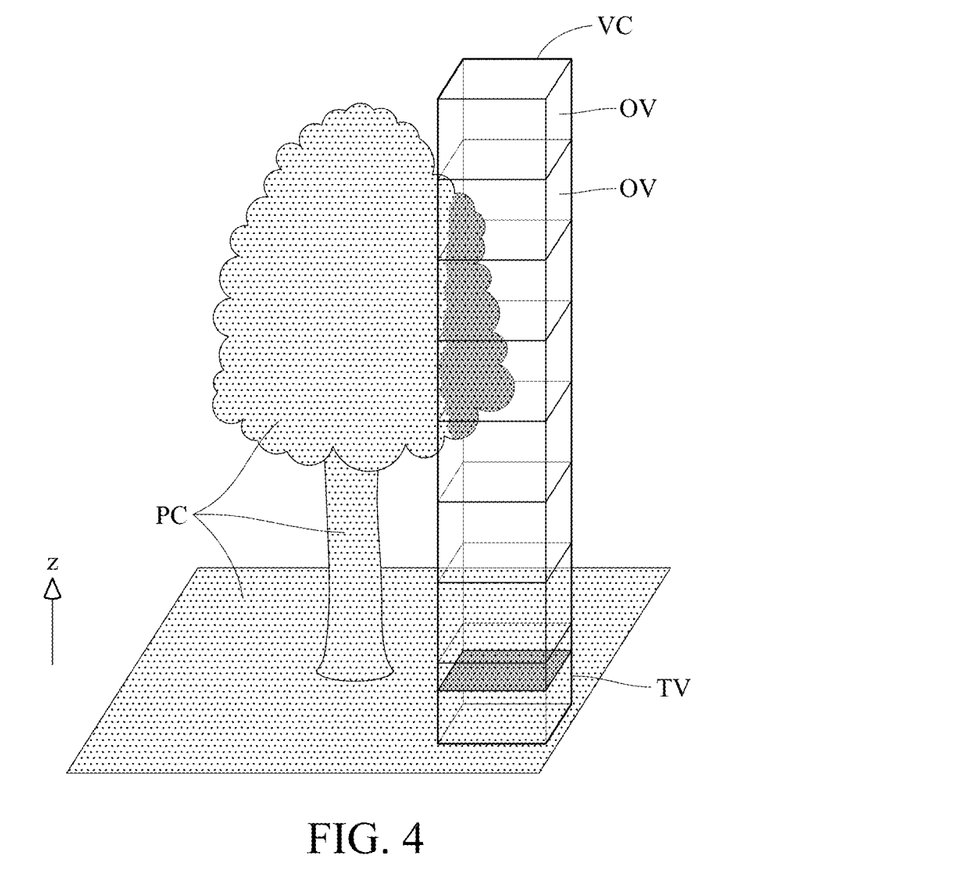
FIG. 4 is a schematic diagram of performing the step of obtaining ground data in a method for extracting road data according to one embodiment of the present disclosure.

In step S11, the processing device 15 may obtain the first environment detection data of the detection region from the environment detector 2 through the data input device 11, and obtain the ground data from the first environment detection data. More particularly, please refer to FIG. 3 and FIG. 4, wherein FIG. 3 is a flowchart of the step of obtaining ground data in a method for extracting road data according to one embodiment of the present disclosure, and FIG. 4 is a schematic diagram of performing the step of obtaining ground data in a method for extracting road data according to one embodiment of the present disclosure. As illustrated in FIG. 3, the step of obtaining the ground data may comprise sub-step S111: dividing the first environment detection data (point cloud) into a plurality of original voxels, wherein the plurality of original voxels constitute a plurality of voxel columns and each of the plurality of voxel columns extends along a vertical axis; sub-step S112: obtaining a plurality of target voxel groups from the plurality of original voxels, wherein the plurality of target voxel groups are respectively included in the plurality of voxel columns, a surface normal of a plurality of points in each of the plurality of target voxel groups is upward and a vertical spread parameter of the plurality of points is less than or equal to a preset value; sub-step S113: calculating a plurality of height values of the plurality of target voxel groups, wherein each of the plurality of height values represents an average value of values on the vertical axis of the plurality of points in the plurality of target voxel groups; and sub-step S114: generating the ground data using the plurality of height values.

Each of the sub-steps is further explained. In sub-step S111 and sub-step S113, the vertical axis may be an axis perpendicular to the horizon. Sub-step S112 may comprise performing on each of the plurality of voxel columns: obtaining a plurality of consistent voxel groups; and regarding the lowest voxel group conforming to a plurality of particular conditions as the target voxel group. The particular conditions may comprise: (1) the normal of the surface constituted by the points included in the consistent voxel group is upward; and (2) the vertical spread parameter of the points included in the consistent voxel groups is less than or equal to the preset value. The lowest voxel group conforming to the particular conditions may be the one, closest to the horizon on the vertical axis, of one or more consistent voxel groups conforming to the above-mentioned conditions (1) and (2). The normal of the surface (surface normal) in condition (1) may be determined by principal component analysis and a scanner trajectory. For example, the scanner trajectory may be a scanner trajectory of the environment detectors which generates the environment detection data. Specifically, the principal component analysis may estimate two normal candidates with opposite directions, wherein the normal candidate located on the same side as the scanner trajectory is selected as the surface normal. The fact that the surface normal is upward indicates that an angle between the surface normal and the vertical axis is less than a threshold value. The vertical spread parameter in condition (2) represents a distance between the points distributed along the aforementioned vertical axis. For example, the preset value of the distance is 30 cm. In one implementation, the processing device 15 may delete points outside the target voxel groups, that is, merely keep the points in the target voxel groups.

Sub-step S114 may comprise: performing a region growing operation or a connected component operation on the plurality of height values of the plurality of target voxel groups to form a plurality of connected groups of height values; and selecting at least one of the plurality connected groups of height values as the ground data according to an overlap region between each of the plurality connected groups of height values and the scanner trajectory. For example, said at least one of the plurality connected groups of height values is the connected group of height values with the largest overlap region or the connected group(s) of height values of which the overlap region is more than a preset threshold. The height value of the target voxel group may be an average value of height values of the points in the target voxel group. In one implementation, the processing device 15 may delete points outside the connected group(s) of height values selected as the ground data, that is, merely keep the points in the connected group(s) of height values selected as the ground data.

The point cloud PC as illustrated in FIG. 4 is taken as an example. The voxel columns VC are constituted by the original voxels OV arranged along the z-axis. It should be noted that FIG. 4 merely exemplarily illustrates one voxel column VC constituted by original voxels OV and the target voxel group TV included in the voxel column VC, but in practice, the entire point cloud PC would be divided into original voxels OV and the original voxels OV constitutes a plurality of voxel columns VC. The number of the voxel columns VC and the number of the original voxels OV constituting each voxel column are not limited to the present disclosure. In FIG. 4, the voxel column VC is constituted by eight original voxels OV that are denoted as voxels 1-8 from bottom to top. Voxels 1 and 4-7 comprise points. Voxels 2, 3 and 8 do not comprise any point. Voxels 1 and 4-7 may be divided into two consistent voxel groups that are respectively constituted by voxel column 1 and voxel columns 4-7. The points in the consistent voxel group constituted by voxel column 1 conform to the conditions that the surface normal is upward and the vertical spread parameter is less than or equal to a preset value, and thus the consistent voxel group constituted by voxel column 1 serve as the target voxel group TV. The average value of the values on the vertical axis z of the points in the target voxel group TV serve as the height value of the target voxel group TV, and may be used to generate the ground data. The method of generating the ground data is described as above and is not repeated here.

Figure 5:
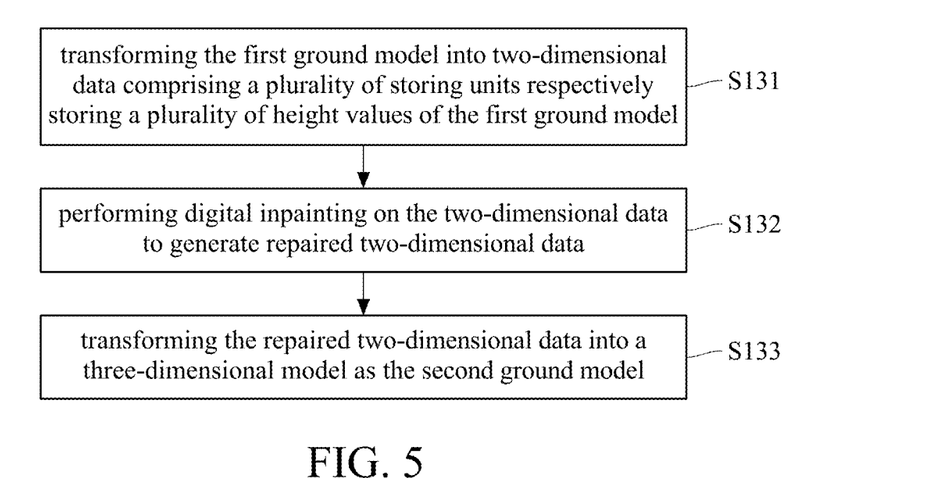
FIG. 5 is a flowchart of the step of filling in a missing region in a method for extracting road data according to one embodiment of the present disclosure.

Please refer to FIG. 1 and FIG. 2 again. In step S12, the processing device 15 obtains the first ground model using the ground data. In an implementation, the processing device 15 utilizes the ground data obtained in step S11 as the first ground model. In another implementation, the processing device 15 utilizes a curved surface model to perform an approximation operation on the ground data to obtain the first ground model. In step S13, the processing device 15 fills in the missing region of the first ground model to obtain the second ground model. More particularly, please refer to FIG. 5, which is a flowchart of the step of filling in a missing region in a method for extracting road data according to one embodiment of the present disclosure. As illustrated in FIG. 5, the step of filling in the missing region may comprise: sub-step S131: transforming the first ground model into two-dimensional data comprising a plurality of storing units respectively storing a plurality of height values of the first ground model; sub-step S132: performing digital inpainting on the two-dimensional data to generate repaired two-dimensional data; and sub-step S133: transforming the repaired two-dimensional data into a three-dimensional model as the second ground model. The two-dimensional data is a regular grid, for example. The missing region may be a blocked region or an undetected region. The digital inpainting may fill in any shape of the missing region. For example, the digital inpainting may be to solve a function $f$ of the missing region $\Omega$, and the digital inpainting may minimize Laplacian $\Delta f$ while maintaining the continuity of the missing region boundary $\partial \Omega$. The function $f$ and the Laplacian $\Delta f$ are shown as follows:

$$\operatorname*{argmin}_{f|_{\partial\Omega}=g} \int_{\Omega} (\Delta f)^2 dx dy$$

$$\Delta f = \frac{\partial^2 f}{\partial x^2} + \frac{\partial^2 f}{\partial y^2}$$

Figure 6:
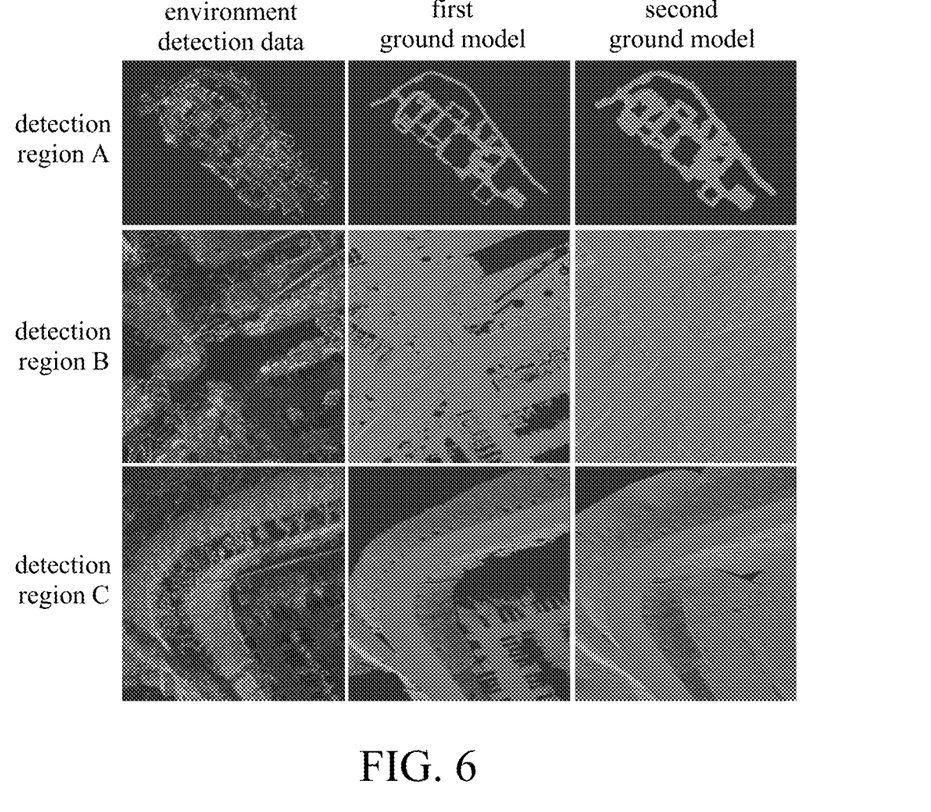
FIG. 6 is a schematic diagram of environment detection data, first ground models and second ground models of detection regions according to one embodiment of the present disclosure.

Please refer to FIG. 6, which is a schematic diagram of environment detection data, first ground models and second ground models of detection regions according to one embodiment of the present disclosure. FIG. 6 shows the environment detection data (point cloud) of detection regions A-C, the first ground models obtained by performing the aforementioned step S11 and step S12 in FIG. 2 on the environment detection data of the detection region A-C and the second ground models obtained by performing the aforementioned step S13 in FIG. 2 on the first ground models corresponding to the detection regions A-C.

Please refer to FIG. 1 and FIG. 2 again. In step S14, the processing device 15 obtains the road attributes of the detection region according to the second ground model. More particularly, the processing device 15 may obtain a plurality of height values in the region formed by a preset driving path expanding outward by a preset distance from the second ground model, and then calculate the road attributes such as a slanted angle, a slope, curvature, etc. of the surrounding terrain (regarded as a road) of the preset driving path. The number of the preset driving path may be one or more. For example, the preset driving path is a suggested path of Google Maps or a driving path pre-programmed by a user, and the preset distance is a width of the general pavement or a width of a car, but the preset driving path and the preset distance are not limited thereto.

In step S15, the processing device 15 performs the road damage identification using the second environment detection data of the detection region and the second ground model. In an implementation, the second environment detection data and the first environment detection data for generating the second ground model are the same data. Because the points belonging to road damage (for example, holes and ruts) in the originally-detected point cloud may be determined as non-ground data in step S11 and are not included in the ground model, the road damage identification is performed using the originally-detected point cloud and the ground model to fill up the data of the road damage position(s). In another implementation, the second environment detection data and the first environment detection data belong to the same detection region but are detected at different time points. Because the road damage position(s) may be changed after a period of time, the processing device 15 may obtain the second environment detection data from the environment detector 2 by the data input device 11 after building the ground model for a period of time to perform the road damage identification, and then update the ground data corresponding to the ground model. In particular, the processing device 15 may obtain the environment detection data detected by the environment detector 2 at regular intervals to update the ground data at regular intervals.

Figure 7:
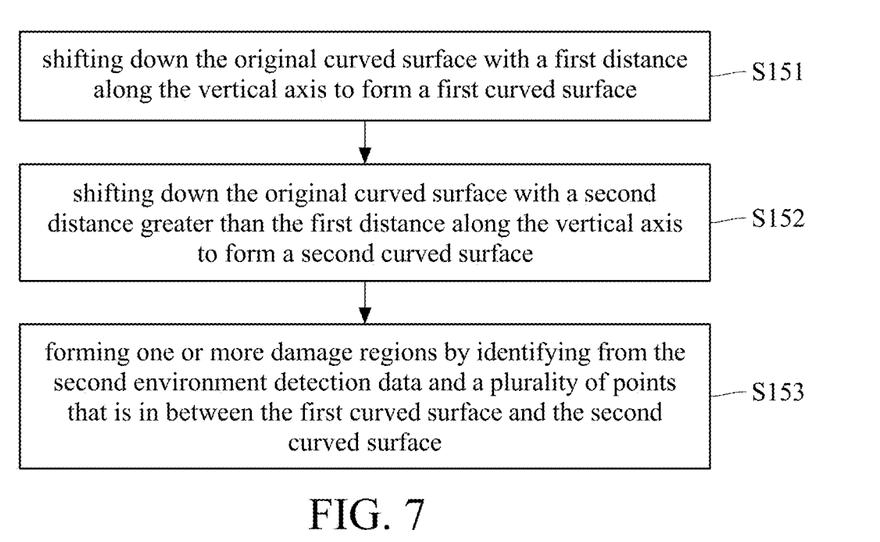
FIG. 7 is a flowchart of the step of road damage identification in a method for extracting road data according to one embodiment of the present disclosure.

Step S15 is further explained. Please refer to FIG. 7, which is a flowchart of the step of road damage identification in a method for extracting road data according to one embodiment of the present disclosure. As described above, the first ground model may be the ground data obtained in step S11 or the curved surface model approximate to the ground data, and the second ground model is obtained by performing the filling operation on the first ground model. Hence, the second ground model may comprise a curved surface (referred to as an original curved surface hereinafter) or be the curved surface. As illustrated in FIG. 7, the step of road damage identification may comprise sub-step S151: shifting down the original curved surface with a first distance along the vertical axis to form a first curved surface; sub-step S152: shifting down the original curved surface with a second distance greater than the first distance along the vertical axis to form a second curved surface; and sub-step S153: determining that a plurality of points between the first curved surface and the second curved surface in the point cloud to form one or more damage regions. In particular, the first curved surface may be associated with a precision of the point cloud, and the precision of the point cloud depends on a scanning precision of the environment detector; the second distance may be associated with a detection error generated by the environment detector due to a particular environment factor (such as the reflection of water on the road). For example, if the value on the vertical axis of the data of the reflection of water on the road detected by is usually below 6 cm, the second distance may be set as 6 cm. It should be noted that that the order of sub-step S151 and sub-step S152 is not limited in the present disclosure.

Figure 8:
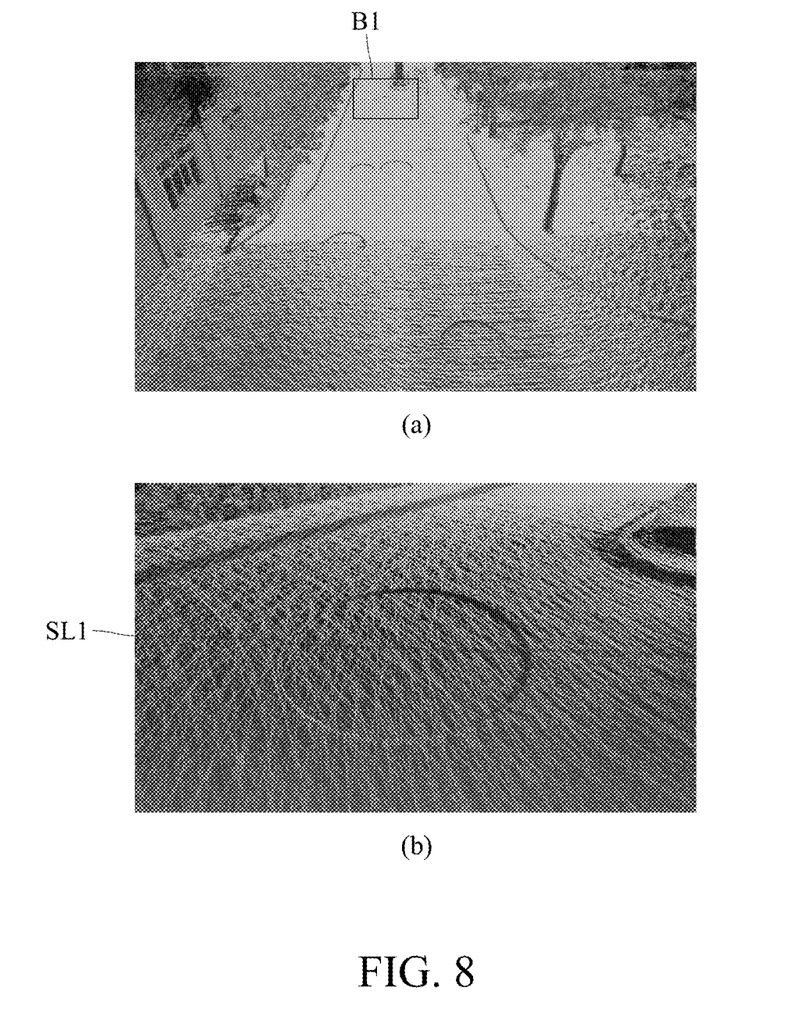
FIG. 8-FIG. 10 are schematic diagrams of performing the step of road damage identification in a method for extracting road data according to one embodiment of the present disclosure.
Figure 9:
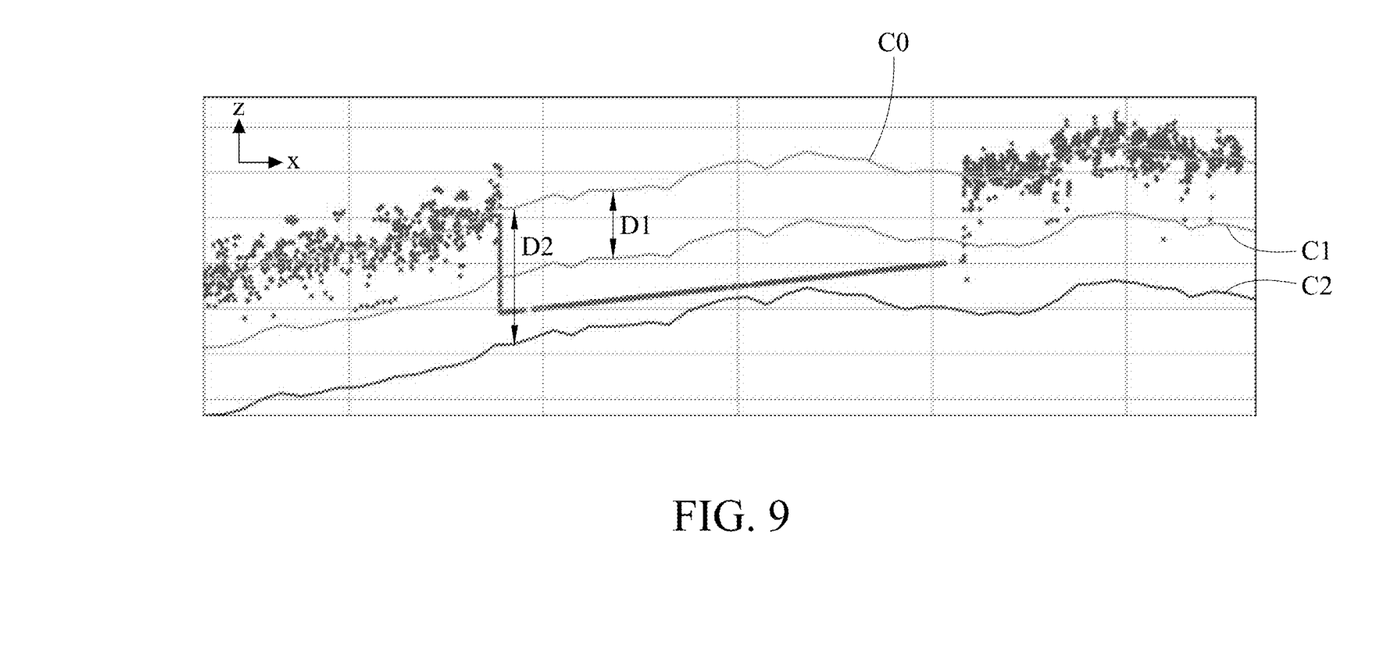
Figure 10:
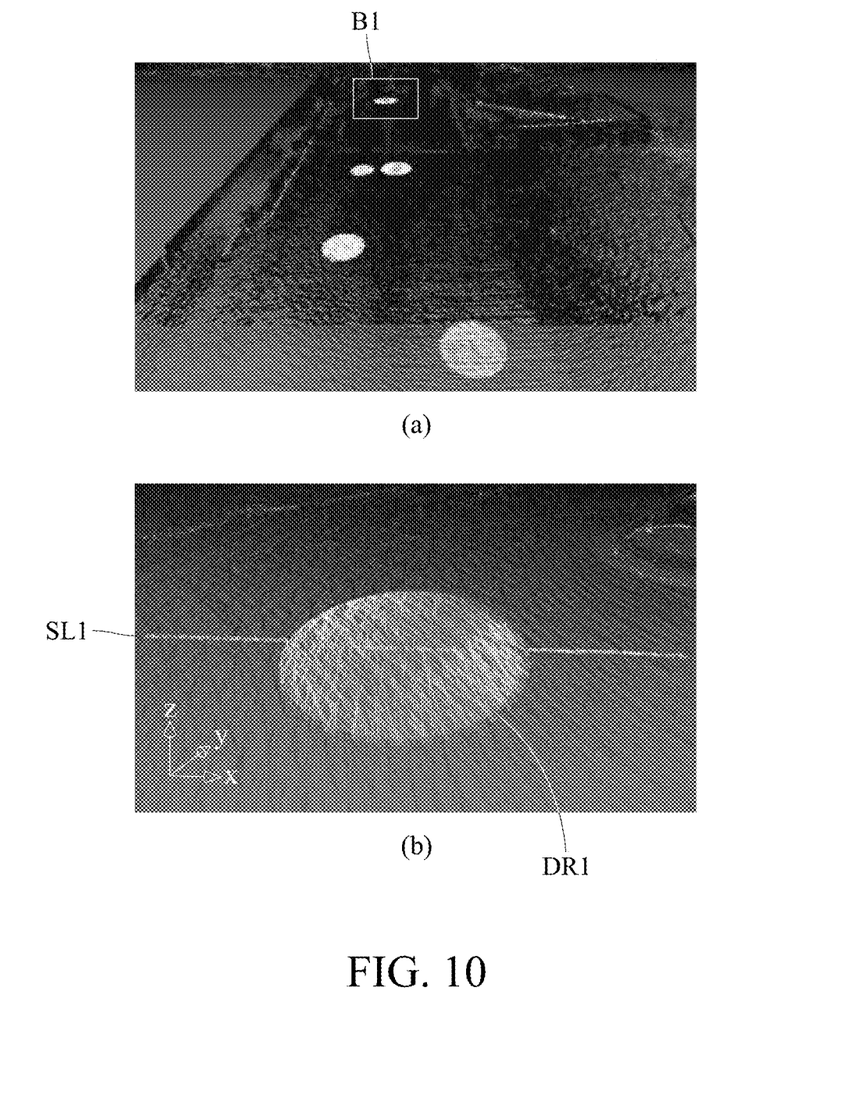

The aforementioned sub-steps are explained with schematic drawings. Please refer to FIG. 8-FIG. 10, which are schematic diagrams of performing the step of road damage identification in the method for extracting road data according to one embodiment of the present disclosure. FIG. 8(a) exemplarily shows the second environment detection data, and an enlargement drawing of the region B1 is shown in FIG. 8(b). FIG. 9 exemplarily shows cross-sections of the second environment detection data, the original curved surface C0, the first curved surface C1 and the second curved surface C2 cut by a section line SL1. The first curved surface C1 is obtained by shifting down the original curved surface C0 with the first distance D1 along the vertical axis z, and the second curved surface C2 is obtained by shifting down the original curved surface C0 with the second distance D2 along the vertical axis z. In this embodiment, the first distance D1 is 3 cm, and the second distance D2 is 6 cm, but the present disclosure is not limited thereto. The points between the first curved surface C1 and the second curved surface C2 in the second environment detection data (point cloud) are determined as the points which forms the damage region DR1 as illustrated in FIG. 10(b). FIG. 10(a) and FIG. 10(b) respectively show data schematic diagrams of the marked road damage positions in the second environment detection data as illustrated in FIG. 8(a) and FIG. 8(b).

Please refer to FIG. 1 and FIG. 2 again. In step S16, the processing device 15 stores the road attributes and the result of the road damage identification in the storage device 13 as the pieces of road data of the detection region. Specifically, the road attributes and the result of the road damage identification may be stored in a format of one of a triangular irregular network, a regular grid and waypoints. Said waypoints may be a plurality of points on the preset driving path, and each of the points on the preset driving path stores the road attributes and/or the result of the road damage identification (for example, with/without damage) of the corresponding position. In one implementation, the road data may further comprise the second ground model, and the second ground model may be stored in one of the aforementioned formats with the road attributes and the result of the road damage identification. In particular, the data such as the ground model, the road attributes, the result of the road damage identification, etc. may be stored in a format of one of a triangular irregular network, a regular grid and waypoints. One or more kinds of said data may be stored in the same piece of data or in different pieces of data, and the present disclosure is not limited thereto.

In particular, the method for extracting road data and the system for extracting road data described in the aforementioned one or more embodiments may be applied to the building of high-precision map and/or the control of the self-driving car.

Figure 11:
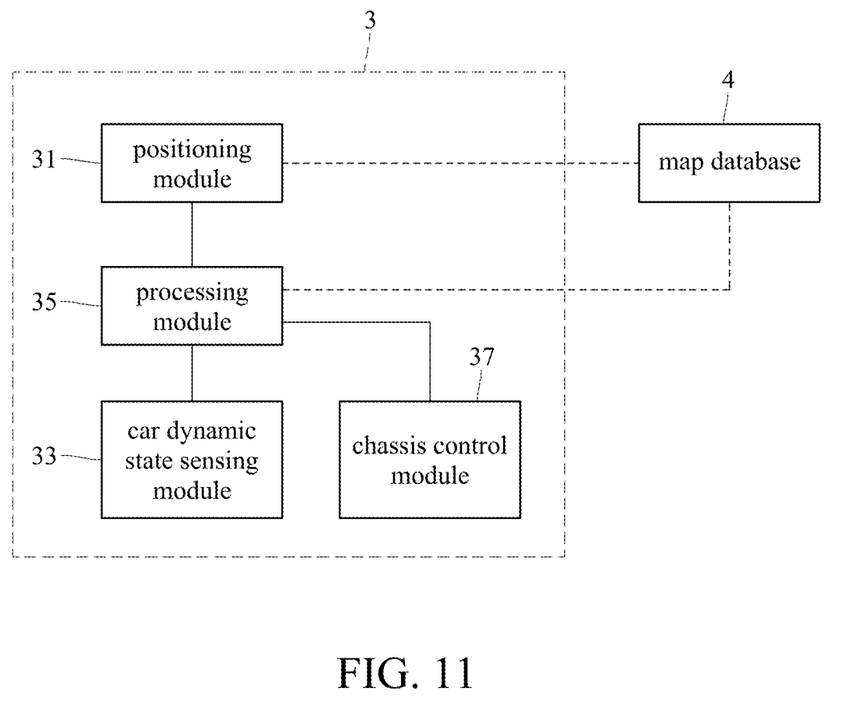
FIG. 11 is a functional block diagram of an operation environment of a system for controlling self-driving car according to one embodiment of the present disclosure.

Please refer to FIG. 11, which is a functional block diagram of an operation environment of a system for controlling self-driving car according to one embodiment of the present disclosure. As illustrated in FIG. 11, the system for controlling self-driving car 3 comprises a positioning module 31, a car dynamic state sensing module 33, a processing module 35 and a steering angle control module 37. The processing module 35 may be connected to the positioning module 31, the car dynamic state sensing module 33 and the steering angle control module 37 by wire connection or wireless connection, and the positioning module 31 and the processing module 35 may be connected to a map database 4 by wire connection or wireless connection. The map database 4 comprises maps of one or more detection region each of which comprises pieces of pre-stored road data, wherein the pieces of pre-stored road data may be obtained by the method for extracting road data and the system for extracting road data described in the aforementioned one or more embodiments, and the details are not described again. In particular, the map database 4 may be implemented by the storage device in the system for extracting road data described in the aforementioned embodiments.

The positioning module 31 is configured to obtain a current position of the controlled car and may comprise but not limited to a position sensor, etc. The car dynamic state sensing module 33 is configured to obtain a current velocity of the car and may comprise but not limited to a dynamic sensor such as a wheel speed sensor, a steering wheel angle sensor, a yaw angle sensor, a deceleration sensor, etc. The steering angle control module 37 is configured to control a steering angle of the car according to a steering command, and may comprise but not limited to elements controlling braking force and driving force of the car to control yaw action of the car such as a throttle body, a solenoid valve, a relay, etc. The processing module 35 is, for example, a microcontroller in an electronic control unit (ECU) or a central processing unit in a microcontroller, and is configured to estimate an estimated position after operation time and car chassis control delay time according to the current position and the current velocity of the controlled car, obtain the target road data corresponding to the estimated position from the map database 4 and generate a steering command according to the target road data to control the car through the steering angle control module 37. The estimated position is included in one of the aforementioned one or more detection regions. The processing module 35 may query the map database 4 for pieces of road data of the detection region where the estimated position is located, and obtain the target road data of the estimated position from the pieces of road data.

The operation of the system for controlling self-driving car 3 is further explained. Please refer to FIG. 12, which is a schematic diagram of performing a method for controlling self-driving car by the system for controlling self-driving car according to one embodiment of the present disclosure. The processing module 35 may comprise a moving distance estimation sub-module 351, a road data collection sub-module 353 and a path tracking sub-module 355. For example, the above sub-modules may be respectively implemented by one or more commands or programs with functions of estimating the moving distance, collecting the road data and tracking the path.

Figure 12:
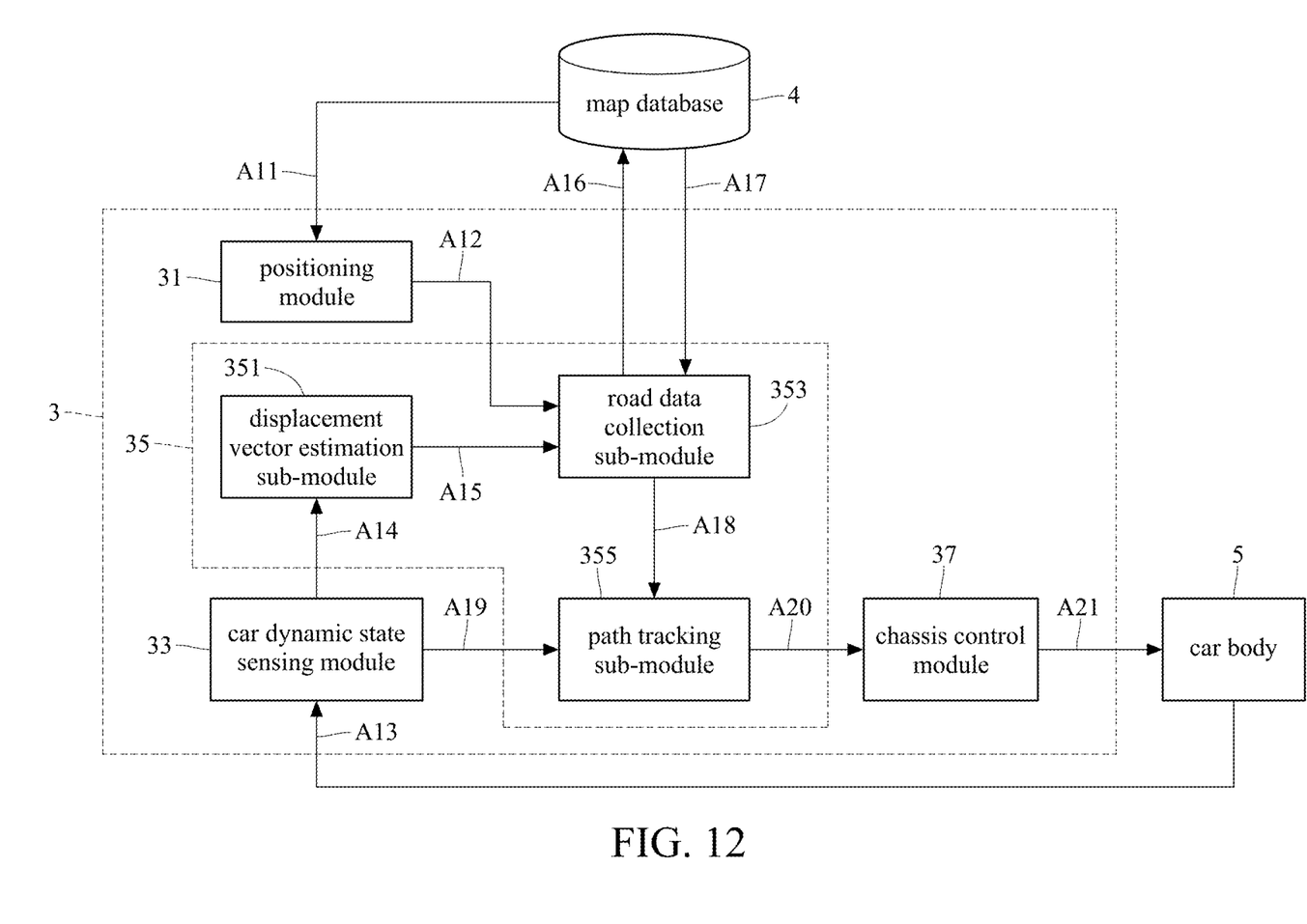
FIG. 12 is a schematic diagram of performing the method for controlling self-driving car by the system for controlling self-driving car according to one embodiment of the present disclosure.

In communication actions A11 and A12, the positioning module 31 obtain the coordinates of the current position of the car on the map, and provide the coordinates of the current position to the road data collection sub-module 353. In communication actions A13 and A14, the car dynamic state sensing module 33 detects car dynamic information (such as a current velocity, a current yaw angle velocity, etc.) from the car body 5 and provides the car dynamic information to the moving distance estimation sub-module 351. The moving distance estimation sub-module 351 adds the operation time of the processing module 35 and the car chassis control delay time of the car body 5 to obtain total delay time, multiplies the total delay time by the current velocity to obtain an estimated moving distance and transmits the estimated moving distance to the path tracking sub-module 355 in the communication action A15. For example, the operation time of the processing module 35 is the total estimated time of performing data processing by the moving distance estimation sub-module 351, the road data collection sub-module 353 and the path tracking sub-module 355. The road data collection sub-module 353 obtains coordinates of the estimated position using the coordinates of the current position and the estimated moving distance. In communication actions A16-A18, the road data collection sub-module 353 quires the map database 4 to obtain the road data corresponding to the coordinates of the estimated position, quires the map database 4 and obtains waypoint information to be moved by the car according to the current position, and transmits the road data to the path tracking sub-module 355. In communication action A19, the car dynamic state sensing module 33 transmits the car dynamic information to the path tracking sub-module 355. The path tracking sub-module 355 generates a steering command according to the road data and the car dynamic information, and transmits the steering command to the steering angle control module 37. The steering angle control module 37 determines a steering angle according to the steering command, and controls the car body 5 according to the steering angle in communication action A21.

Figure 13:
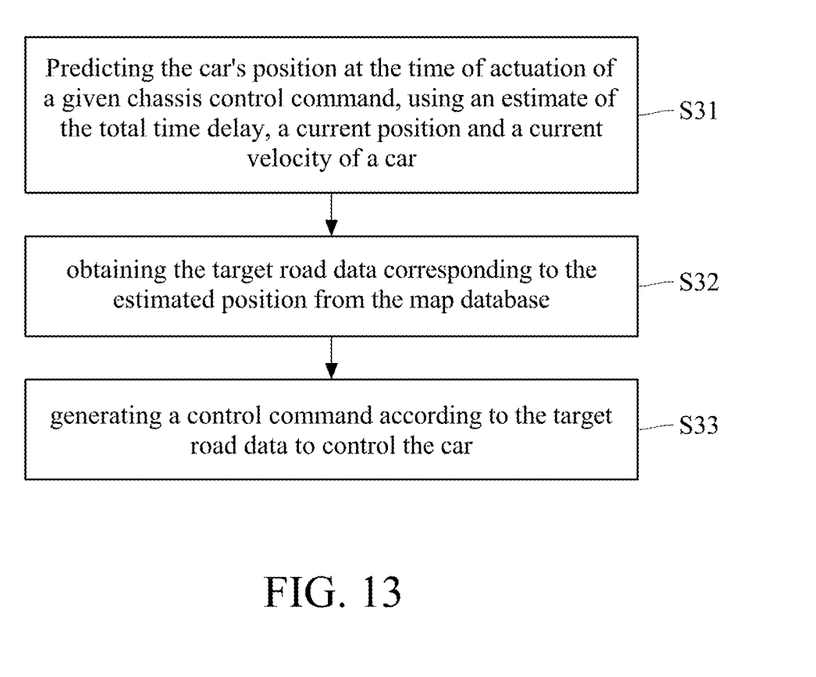
FIG. 13 is a flowchart of the method for controlling self-driving car according to one embodiment of the present disclosure.

Please refer to FIG. 13, which is a flowchart of a method for controlling self-driving car according to one embodiment of the present disclosure. As illustrated in FIG. 13, the method for controlling self-driving car may comprise: step S31: estimating the estimated position after the operation time and the car chassis control delay time according to the current position and the current velocity of a car; step S32: obtaining the target road data corresponding to the estimated position from the map database; step S33: generating the steering command according to the target road data to control the car. The content of steps S31-S33 is the same as that described in embodiments of FIG. 11 and FIG. 12 and not described again.

By the above structure, the method and system for extracting road data disclosed in the present disclosure may classify the environment detection data to obtain the ground data, generate a ground model according to the ground data, optimize the ground model by the filling operation, and obtain the road attributes and the road damage situation using the optimized ground model, thereby obtaining the highly complete road data. The method and system for extracting road data disclosed in the present disclosure may be applied to the building or update of high-precision map to achieve a high-precision map, and may be applied to the control of the self-driving car to elevate a match degree between a control strategy of the self-driving car and an actual road situation. The method and system for controlling self-driving car may control the car according to the highly complete road data obtained by the method for extracting road data as above mentioned, and may solve a problem that the control strategy of the self-driving car is unable to converge the ideal path due to its lack of information about environment variables (road attributes, road damage), so that the moving path of the car may match the ideal path.

Although embodiments of the present disclosure are disclosed as the above, it is not meant to limit the scope of the present disclosure. The amendment and the retouch, which do not depart from the spirit and scope of this disclosure, shall fall within the scope of the present disclosure. For the scope of protection defined by this disclosure, please refer to the attached claims.

SYMBOLIC EXPLANATION

1: system for extracting road data
11: data input device
13: storage device
15: processing device
2: environment detector
z: vertical axis
PC: point cloud
VC: voxel column
OV: original voxel
TV: target voxel group
B1: region
SL1: section line
C0: original curved surface
C1: first curved surface
C2: second curved surface
D1: first distance
D2: second distance
DR1: damage region
3: system for controlling self-driving car
31: positioning module
33: car dynamic state sensing module
35: processing module
37: steering angle control module
4: map database
351: moving distance estimation sub-module
353: road data collection sub-module
355: path tracking sub-module
5: car body
A11~A21: communication action

What is claimed is:

1. A method for extracting road data, comprising performing following steps by a processing device:
obtaining ground data from first environment detection data of a detection region, wherein the first environment detection data is a point cloud;
obtaining a first ground model using the ground data;
filling in missing regions of the first ground model to obtain a second ground model;
obtaining a plurality of road attributes of the detection region according to the second ground model;
performing road damage identification using second environment detection data of the detection region and the second ground model; and
storing the plurality of road attributes and a result of the road damage identification as a plurality of pieces of road data of the detection region,
wherein obtaining the ground data from the first environment detection data of the detection region comprises:
dividing the point cloud into a plurality of original voxels, wherein the plurality of original voxels comprise a plurality of voxel columns;
obtaining a plurality of target voxel groups from the plurality of original voxels, wherein the plurality of target voxel groups are respectively included in a plurality of voxel columns, a vertical spread parameter of a plurality of points in each of the plurality of target voxel groups is less than or equal to a preset value, and the vertical spread parameter is a height difference between a highest point and a lowest point in each of the plurality of target voxel groups;
calculating a plurality of height values of the plurality of target voxel groups; and
generating the ground data using the plurality of height values.

2. The method for extracting road data according to claim 1, wherein
each of the plurality of voxel columns extends along a vertical axis;
each of the plurality of target voxel groups is a group of vertically contiguous voxels satisfying a condition that each of the plurality of target voxel groups resides in a corresponding one of the plurality of voxel column, a surface normal of a surface fitted to the plurality of points in each of the plurality of target voxel groups is upward;
each height value represents an average height of the plurality of points in a target voxel group.

3. The method for extracting road data according to claim 2, wherein the surface normal is determined by principal component analysis and a scanner trajectory.

4. The method for extracting road data according to claim 2, wherein generating the ground data using the plurality of height values comprises:
performing a region growing operation or a connected component operation on the plurality of height values to form a plurality of connected groups of height values; and
selecting at least one of the plurality of connected groups of height values as the ground data by selecting one or more connected groups having a sufficiently large number of height values and having sufficient overlap with a scanner trajectory.

5. The method for extracting road data according to claim 1, wherein filling in the missing region of the first ground model to obtain the second ground model comprises:
transforming the first ground model into two-dimensional data comprising a plurality of pixels respectively storing the plurality of height values of the first ground model;
performing digital inpainting on the two-dimensional data to generate repaired two-dimensional data; and
transforming the repaired two-dimensional data into a three-dimensional model as the second ground model.

6. The method for extracting road data according to claim 1, wherein the second environment detection data is a point cloud and the second ground model comprises an original curved surface, and the performing road damage identification using second environment detection data of the detection region and the second ground model comprises:
shifting down the original curved surface with a first distance along a vertical axis to form a first curved surface;

shifting down the original curved surface with a second distance greater than the first distance along the vertical axis to form a second curved surface; and forming one or more damage regions by identifying a plurality of points from the second environment detection data, wherein the plurality of points from the second environment detection data is in between the first curved surface and the second curved surface.

7. The method for extracting road data according to claim 6, wherein the first distance is associated with a precision of the point cloud, and the second distance is associated with a detection error of an environment detector generating the point cloud, including errors due to environment properties, such as reflective wet road surfaces.

8. The method for extracting road data according to claim 1, wherein the plurality of road attributes are stored in a format of one of a triangular irregular network, a regular grid and waypoints.

9. The method for extracting road data according to claim 1, wherein the first environment detection data and the second environment detection data are detected at different times.

10. A method for controlling a self-driving car comprising performing following steps by a processing device:

predicting the self-driving car's position at time of actuation of a given chassis control command, using an estimate of a processing delay time, an estimate of a chassis control delay time, a current position and a current velocity of the self-driving car;

obtaining target road data corresponding to a estimated position from a map database; and generating a chassis control command according to the target road data to control the self-driving car;

wherein the map database comprises a plurality of pieces of pre-stored road data of a detection region, the estimated position is in the detection region, the target road data is included in the plurality of pieces of pre-stored road data and the plurality of pieces of pre-stored road data are obtained by a road data extracting procedure, and the road data extracting procedure comprises:

obtaining ground data from first environment detection data of the detection region, wherein the first environment detection data is a point cloud;

obtaining a first ground model using the ground data;

filling in missing regions of the first ground model to obtain a second ground model;

obtaining a plurality of road attributes of the detection region according to the second ground model;

performing road damage identification using second environment detection data of the detection region and the second ground model; and storing the plurality of road attributes and a result of the road damage identification as a plurality of pieces of pre-stored road data of the detection region, wherein obtaining the ground data from the first environment detection data of the detection region comprises:

dividing the point cloud into a plurality of original voxels, wherein the plurality of original voxels comprise a plurality of voxel columns;

obtaining a plurality of target voxel groups from the plurality of original voxels, wherein the plurality of target voxel groups are respectively included in a plurality of voxel columns, a vertical spread parameter of a plurality of points in each of the plurality of target voxel groups is less than or equal to a preset value, and the vertical spread parameter is a height difference between a highest point and a lowest point in each of the plurality of target voxel groups;

calculating a plurality of height values of the plurality of target voxel groups; and generating the ground data using the plurality of height values.

11. The method for controlling self-driving car according to claim 10, wherein predicting the self-driving car's position at time of actuation of a given chassis control command, using an estimate of the processing delay time, an estimate of chassis control delay time, a current position and a current velocity of the self-driving car, comprises:

adding the processing delay time and the chassis control delay time to obtain an estimate of total delay time;

multiplying the total delay time by the current velocity to obtain an estimated displacement vector; and obtaining the estimated position using the current position and the estimated displacement vector.

12. A system for extracting road data comprising:

a data input device configured to receive first environment detection data and second environment detection data, wherein the first environment detection data is a point cloud;

a storage device; and a processing device connected to the data input device and the storage device and configured to perform following steps:

obtaining ground data from the first environment detection data;

obtaining a first ground model using the ground data;

filling in missing regions of the first ground model to obtain a second ground model;

obtaining a plurality of road attributes of a detection region according to the second ground model;

performing road damage identification using the second environment detection data and the second ground model; and storing the plurality of road attributes and a result of the road damage identification as a plurality of pieces of road data of the detection region, wherein obtaining the ground data from the first environment detection data of the detection region comprises:

dividing the point cloud into a plurality of original voxels, wherein the plurality of original voxels comprise a plurality of voxel columns;

obtaining a plurality of target voxel groups from the plurality of original voxels, wherein the plurality of target voxel groups are respectively included in a plurality of voxel columns, a vertical spread parameter of a plurality of points in each of the plurality of target voxel groups is less than or equal to a preset value, and the vertical spread parameter is a height difference between a highest point and a lowest point in each of the plurality of target voxel groups;

calculating a plurality of height values of the plurality of target voxel groups; and generating the ground data using the plurality of height values.

13. The system for extracting road data according to claim 12, wherein each of the plurality of voxel columns extends along a vertical axis, each of the plurality of target voxel groups is a group of vertically contiguous voxels satisfying a condition that each of the plurality of target voxel groups resides in a corresponding one of the plurality of voxel column and a surface normal of a surface fitted to the plurality of points in each of the plurality of target voxel groups is upward, and each of plurality of height values represents an average height of the plurality of points in each of the plurality of target voxel groups.

14. The system for extracting road data according to claim 13, wherein the surface normal is determined by principal component analysis and a scanner trajectory.

15. The system for extracting road data according to claim 13, wherein the processing device is configured to perform a region growing operation or a connected component operation on the plurality of height values to form a plurality of connected groups of height values and select at least one of the plurality connected groups of height values as the ground data according to the size of a connected group and the amount of overlap between a connected group of height values and a scanner trajectory.

16. The system for extracting road data according to claim 12, wherein the processing device is configured to transform the first ground model into two-dimensional data, performs digital inpainting on the two-dimensional data to generate repaired two-dimensional data and transform the repaired two-dimensional data into a three-dimensional model as the second ground model; wherein the two-dimensional data comprises a plurality of pixels respectively storing the plurality of height values of the first ground model.

17. The system for extracting road data according to claim 12, wherein the second environment detection data is a point cloud and the second ground model comprises an original curved surface, and the processing device shifts down the original curved surface with a first distance along a vertical axis to form a first curved surface, and shifts down the original curved surface with a second distance greater than the first distance along the vertical axis to form a second curved surface and determines a plurality of points from the second environment detection data between the first curved surface and the second curved surface in the point cloud to form one or more damage regions.

18. The system for extracting road data according to claim 17, wherein the first distance is associated with a precision of the point cloud, and the second distance is associated with a detection errors due to environment factors, including wet reflective road surfaces.

19. The system for extracting road data according to claim 12, wherein the plurality of road attributes are stored in a format of one of a triangular irregular network, a regular grid and waypoints.

20. The system for extracting road data according to claim 12, wherein the first environment detection data and the second environment detection data are detected at different times.

21. A system for controlling a self-driving car comprising:
a positioning module configured to obtain a current position of the self-driving car;
a car dynamic state sensing module configured to obtain a current velocity of the self-driving car;
a chassis control module configured to control the self-driving car according to a chassis control command;
a processing module connected to the positioning module, the car dynamic state sensing module and the chassis control module and configured to perform following steps:
predicting the self-driving car's estimated position at time of actuation of a given chassis control command, using the self-driving car's current position, the car's current velocity, an estimate of processing delay time and an estimate of chassis control delay time;
obtaining target road data corresponding to the estimated position from a map database; and
generating a chassis control command, according to the target road data to control the self-driving car;
wherein the map database comprises a plurality of pieces of pre-stored road data of a detection region, the estimated position is in the detection region, and the target road data is included in the plurality of pieces of pre-stored road data and the plurality of pieces of pre-stored road data are obtained by a road data extracting procedure, and the road data extracting procedure comprises:
obtaining ground data from first environment detection data of a detection region, wherein the first environment detection data is a point cloud;
obtaining a first ground model using the ground data;
filling in missing regions of the first ground model to obtain a second ground model;
obtaining a plurality of road attributes of the detection region according to the second ground model;
performing road damage identification using second environment detection data of the detection region and the second ground model; and
storing the plurality of road attributes and a result of the road damage identification as a plurality of pieces of pre-stored road data of the detection region,
wherein obtaining the ground data from the first environment detection data of the detection region comprises:
dividing the point cloud into a plurality of original voxels, wherein the plurality of original voxels comprise a plurality of voxel columns;
obtaining a plurality of target voxel groups from the plurality of original voxels, wherein the plurality of target voxel groups are respectively included in a plurality of voxel columns, a vertical spread parameter of a plurality of points in each of the plurality of target voxel groups is less than or equal to a preset value, and the vertical spread parameter is a height difference between a highest point and a lowest point in each of the plurality of target voxel groups;
calculating a plurality of height values of the plurality of target voxel groups; and
generating the ground data using the plurality of height values.

22. The system for controlling self-driving car according to claim 21, wherein the processing module adds the processing time of the processing module and the chassis control delay time to obtain a total delay time, multiplies the total delay time by the current velocity to obtain an estimated displacement vector and obtains the estimated position using the current position and the estimated displacement vector.

* * * * *